(12) United States Patent
Van Der Plas

(10) Patent No.: US 6,694,714 B2
(45) Date of Patent: Feb. 24, 2004

(54) SILAGE CUTTING IMPLEMENT

(75) Inventor: Nicolaas Van Der Plas, Oldenzaal (NL)

(73) Assignee: Trioliet Mullos B.V., Oldenzaal (NL)

( * ) Notice: Subject to any disclaimer, the term of this patent is extended or adjusted under 35 U.S.C. 154(b) by 0 days.

(21) Appl. No.: 10/085,473

(22) Filed: Feb. 27, 2002

(65) Prior Publication Data
US 2002/0129590 A1 Sep. 19, 2002

(30) Foreign Application Priority Data
Mar. 14, 2001 (DE) ................... 201 04 426 U

(51) Int. Cl.⁷ .................. A01D 34/64; A01D 43/00
(52) U.S. Cl. ........................... 56/14.9; 56/153
(58) Field of Search .................. 56/14.9, 194, 202, 56/227, 153

(56) References Cited

U.S. PATENT DOCUMENTS 5,768,872 A * 6/1998 Von Allworden ............ 56/341

FOREIGN PATENT DOCUMENTS

| DE | 4332267 | 3/1995 | ............ A01F/25/20 |
| DE | 29926030 | 12/1999 | ............ A01K/5/00 |
| DE | 29916030 | 1/2000 | ............ A01K/5/00 |
| DE | 29920834 | 3/2000 | ............ A01F/25/20 |
| EP | 0506158 | 9/1992 | ............ A01F/25/20 |
| EP | 0562542 | 9/1993 | ............ A01F/25/20 |
| EP | 761087 A1 * | 3/1997 | ............ A01F/25/20 |
| EP | 0599151 | 7/1997 | ............ A01F/25/20 |
| EP | 1062861 A1 * | 12/2000 | ............ A01F/25/20 |
| FR | 2501130 A1 * | 3/1981 | |
| FR | 2754671 | 4/1998 | ............ A01F/25/20 |
| FR | 2773433 | 7/1999 | ............ A01D/90/00 |
| GB | 2087206 | 5/1982 | ............ A01F/25/20 |

* cited by examiner

Primary Examiner—Thomas B. Will
Assistant Examiner—Alicia Torres
(74) Attorney, Agent, or Firm—Darby & Darby

(57) ABSTRACT

A silage cutting implement for mounting to a mobile working vehicle has lower and upper parts interconnected by a horizontal pivot axis with a lower part having a loading plane connected by an angled section to a rear frame structure and an upper part having a separation plane connected to a rear frame by an angled section. Hydraulic cylinders are mounted between the upper and lower parts at the side of the pivot axis facing to the loading plane and the separation plane with the linkage points for the hydraulic cylinders provided in the angled sections. A sensing device is provided which senses a difference between the extended lengths of the cylinders.

11 Claims, 4 Drawing Sheets

SILAGE CUTTING IMPLEMENT

FIELD OF THE INVENTION

The present invention relates to a silage cutting implement.

The present invention relates to a silage cutting implement according to the preamble part of claim 1.

BACKGROUND OF THE INVENTION

Due to the current problems of keeping cattle a trend has developed towards extremely large cattle farm or to very small cattle farms. Extremely large cattle farms, e.g. in France, frequently employ large working vehicles like wheel loaders which allow to manipulate different tools, even silage cutting implements. Small cattle farms tend to employ cutting implements as well, because large combined cutting and mixing aggregates are costly and cannot be used efficiently enough. For that reason there is a significant demand for powerful silage cutting implements.

In a cutting implement known from DE 299 20 834 U which is to be mounted to the front or rear of a tractor, the hydraulic cylinders are supported behind the frame structure of the lower part of the equipment at low positioned linkage points. The upper linkage points are located at outriggers which are cantilevered rearwards from the frame of the upper part of the implement. Because the hydraulic cylinders are retracted when the cutting implement is fully opened, they have to have a structurally limited cylinder length which limits the vertical silage taking range of the fully opened cutting implement. Since the lever arms between the hydraulic cylinders and the pivot axis are very short in relation to the lever arm of the cutting edge of the upper part of the implement neither high cutting forces nor a uniform cutting movement can be achieved. The described design principle can be found in practically all cutting implements which have been available for at least thirty years on an up to now small market. The available cutting implements vary from each other only in details and are designed like two-part excavator shovels and are driven like them. However, the known cutting implements are not able to properly cut out a slice over the full height of the silage block which nowadays in the farming industry is usually as high as 2.2 m or more. The known cutting implements take only a relatively small portion from the silage block, i.e. a bit. A continuous slice, however, is extremely expedient in view to the quality and the form of the cutting surfaces in the silage block, the quality and homogeneity of the fodder formed by mixing the slice, and the loss free and comfortable consumption of silage blocks of differing heights and/or forms, and in order to improve the acceptance of such cutting implements on the presently positively developing market.

In a cutting implement of this kind (EP 05 62 542 A) the hydraulic cylinders are positioned inside in the loading area of the cutting implement. As soon the hydraulic cylinders close the filled cutting implement they are pivoting into the silage charge. The distances of the linkage points of the hydraulic cylinders to the pivot axis are extremely different and increase the danger of an unstable cutting operation and of distortions particularly of the upper part of the implement.

The hydraulic cylinders controlling the silage cutting operation of a self-propelling fodder mixer aggregate (DE 29 916 030 U) are positioned behind the lower loading shovel which temporarily takes the separated silage slice before it transfers its load into the mixing chamber.

Further prior art is contained in DE 43 32 267 A, FR 27 54 671 A, EP 05 99 151 A, FR 27 73433 R, GB 20 87 206 A, EP 05 06 158 A.

OBJECT OF THE INVENTION

It is an object of the invention to provide a powerful silage cutting implement which suits to the manipulating capacity of modern working vehicles, which has a vertical silage gripping range corresponding with the full height of silage blocks as are usually found in farming practice and which allows a clear, powerful cut and the separation of a slice which continuously extend over the full height of the silage block.

BRIEF DESCRIPTION OF THE INVENTION

Thanks to the hydraulic cylinders provided between the pivot axis and the active cutting edge, which hydraulic cylinders are retracted during the cutting operation, not only an extremely high silage taking range corresponding to the usual heights of silage blocks can be obtained but also a powerful and smooth cut with high cutting force and advantageous lever relationships. The intended deviation from usual concepts of silage cutting implements matches with modern, powerful working vehicles and connection assemblies allowing to optimally use the advantage of the large silage taking range, to achieve an expedient cutting surface form and cutting surface quality in the silage block and to prepare fodder of high quality from the separated slice. Normally, the farmer or rancher holds working vehicles of modern design and by far sufficient efficiency useful also for other work. Similar drive concepts exists at large, ground borne combined silage mixing and cutting aggregates for which other prerequisites are true which cannot be compared to the prerequisites of such simple silage cutting implements. Such long hydraulic cylinders when extended allow to obtain the desired high silage taking range and can be positioned comfortably between the angled sections such that they can use the largest interior width of the closed cutting implement. Advantageous active lever arms result if the frame structure has prolongations gripping beyond the side walls of the lower part of the implement in which prolongations the pivot axis is located. The hydraulic cylinders located at the outer sides of the cutting implement need not get in contact with the silage block since only slices with limited cutting depth are cut out.

Expediently the distance from the pivot axis to the linking point at the lower part of the implement is larger than the distance from the pivot axis to the linking point at the upper part of the implement. This increases the silage taking range and leads to high cutting forces resulting in a proper and smooth cut.

In practice frequently silage blocks exist of a height of at least 2.2 m, or even higher, the distances or lever arms as selected for the design of the cutting implement and of its driving components should be matched with each other such that a cutting or silage taking range is obtained which amounts in vertical direction to at least 2.2 m, preferably up to 3.0 m, more preferably even up to 4.5 m. The closed cutting implement, however, has a comfortable handling size and a weight which can be manipulated easily by wheel loaders, modern tractors or front loaders.

To transmit the high cutting forces without problems into the parts of the cutting implement it is recommendable to provide stiffening parts forming protecting and pocket-shaped sockets for the linkage points of the hydraulic cylinders. The stiffening parts, furthermore, serve to enforce the parts of the cutting implement and of the load sensitive angled sections. The stiffening parts allow, furthermore, to position the linkage points as low and as high, respectively, as possible to use hydraulic cylinders of large cylinder length.

As the separated slice has to be transported in the closed cutting implement to the disposal, it is expedient to form the frame structure at least of the lower part of the implement as a closed rear wall which prevents that silage falls out and which contributes to the overall stability.

As the high silage taking range and the strong cutting forces could be accompanied by distortions of the parts of the cutting implement causing damage or operation disturbances, not only a, e.g. hydraulic, synchronisation control of the hydraulic cylinders is provided, but in addition an, e.g. electromechanical, sensing device for relative-distortions is provided to assist the synchronisation control. Conventional hydraulic synchronisation controls, e.g. employ serially connected hydraulic cylinders of differing cross-sectional areas of which the bigger one is actuating by its piston rod side pressure the piston side end of the smaller one, or parallel flow controlled hydraulic cylinders of equal dimensions by means of a flow divider or a flow regulating device. However, in practice these operate with tolerances of several percent and can for that reason not reliably exclude distortions finally leading to a blockage. Even conventional mechanical synchronisation controls are not reliable enough. The additional, e.g. electromechanical, sensing device apt to overrule the synchronisation control in case of a too strong distortion, however, helps to avoid damages and even may interfere intentionally to eliminate distortions as soon as they tend to occur.

In a structurally simple manner the sensing device is equipped by two linkage mechanisms provided at both sides of the cutting implement which linkage mechanisms have a mutual mechanical coupling for the actuation of a signal generator in case that a not tolerable deviation occurs between the respective pivoting angles, e.g. of the upper part of the cutting implement, at both sides of the cutting implement. Expediently the signal generator generates an alarm signal and/or a switch off signal and/or a correction signal for the synchronisation control. The alarm signal may be used to reduce the cylinder actuation forces and to check the situation. The switch off signal may interrupt the cutting operation for safety reasons. The correction signal can be used to intentionally interfere hydraulically until both hydraulic cylinders again are synchronised and work with equal lengths.

The linkage mechanisms of the sensing device expediently employs two first links bridging the pivot axis, two sensing links, one of which rotates the coupling shaft, and a reference lever detecting the angular displacement between both sensing links and actuating a signal generating switching device in case that a distortion is detected which cannot be tolerated.

A smooth, gradual interference of the sensing device is possible if the reference lever is controlled by a flexible switch actuating tongue.

The switching device expediently contains two alternatingly actuatable limit switches, e.g. electric microswitches, informing the synchronisation control by generated signals which of the cylinders is leading or is trailing. Then the synchronisation control can interfere in a correcting sense.

In order to achieve a proper cut, to avoid disturbing friction loads and to rapidly transfer the separated slice into the interior of the cutting implement, it is expedient to form the separating plane with an arcuate curvature. The cutting knife at the lateral edge of the separation plane may be a fixed stationary cutting knife or even may comprise cutting knives which can be driven oscillatingly.

Furthermore, also at the free edge regions of the side walls in the parts of the cutting implements, expediently only adjacent to the lateral edges, cutting knives ought to be provided, either stationary knives or blades or moveable knives, in order to properly form the side edge regions of the slice and/or to cut through the plastic foil which protects the silage.

In order to place the cutting implement close to the centre of gravity of the working vehicle, the cheeks of the frame structure carrying the vehicle connection assemblies should be spaced apart more than the width of the vehicle or the width of the vehicle cabin. Then the vehicle can be brought between the cheeks and close to the frame structure in order to achieve advantageous lever relationships for lifting the cutting implement and for travelling with the filled cutting implement.

BRIEF DESCRIPTION OF THE DRAWINGS

Embodiments of the object of the invention will be explained with the help of the drawing. In the drawing is.

DETAILED DESCRIPTION OF THE INVENTION

Figures 1, 2:
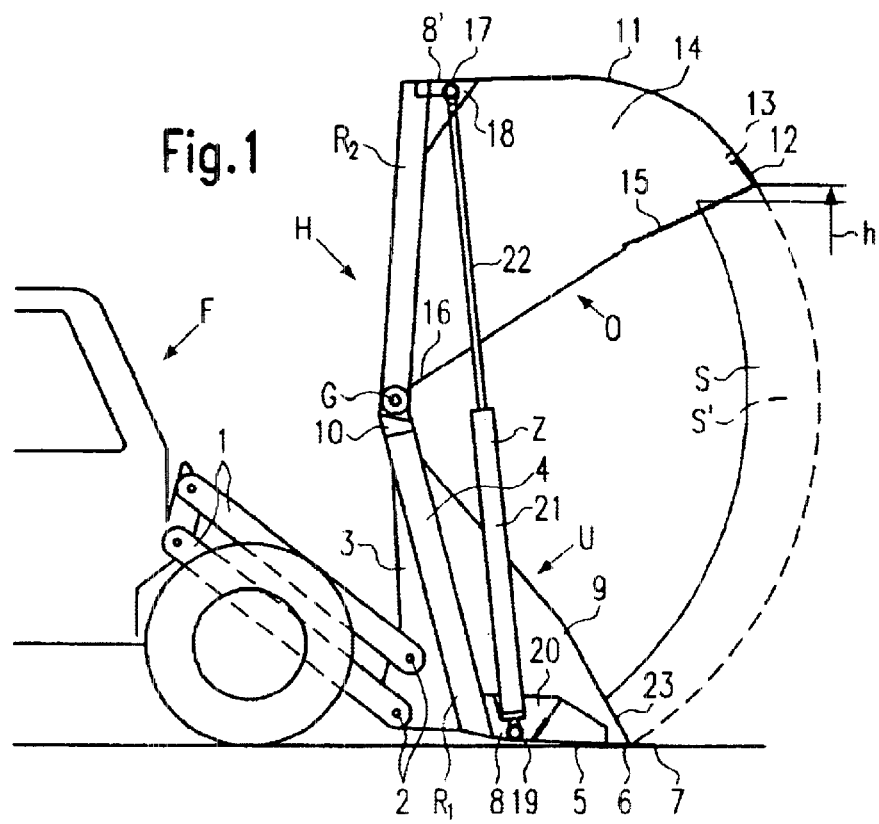
FIG. 1 a schematic side view of a silage cutting implement provided at a wheel loader, in a cut preparation position, FIG. 2 the cutting implement in a transport position, FIG. 3 the silage cutting implement mounted to the front of a tractor, in a cut preparation position, FIG. 4 a cross-section of silage block having the size of a loaf and contained in a plastic foil, FIG. 5 the silage cutting implement mounted to the rear part of a tractor, FIG. 6 a side view of the silage cutting implement having an integrated electromechanic sensing device, FIG. 7 a front view of the cutting implement, FIG. 8 a side view, partially sectioned, of a detail of the sensing device of FIGS. 6 and 7, and FIG. 9 a rear view of the detail of FIG. 8.

A silage cutting implement H is mounted to a working vehicle F, e.g. at its front side, in FIGS. 1 and 2, e.g. to a wheel loader. A parallelogram guiding structure 1 is releasably connected to connection assemblies 2 provided at vertically extending cheeks 3 of a lower part U of the cutting implement. The lower part U of the cutting implement resembles a shovel and has a rear, substantially vertical frame structure R1 which may be formed as a closed rear wall 4. An angled section 8 connects a loading plane 5 to a lower part of frame structure R1. The loading plane 5 has a cutting edge counterstay region 6 and tines 7 at its end. The angle of the angled section 8 between the loading plane 5 and the frame structure R1 is e.g. close to 90°, however, preferably larger than 90°, such that the frame structure R1 is inclined upwardly and obliquely in direction towards the working vehicle F when the loading plane 5 is set on the ground. Side walls 9 are incorporated into the frame structure R1. At least their free edges adjacent to the cutting edge counterstay region 6 are formed like knives or carry cutting edges 23 (optionally even moveable, driven cutting elements).

Above side walls 9 frame structure R1 is provided with upwardly extending prolongations 10 in which a substantially horizontal pivot axis G for a connected to upper part O of the cutting implement is situated. The upper part O of the cutting implement has a rear side frame R2 optionally formed as a closed rear wall. A separating plane 11 extending forward is connected via an angled section 8' to frame R2. The angle between the separating plane 11 and the frame R2 in the angled section 8' is e.g. about 90°, however, larger than 90°. The separating plane 11 ends at a laterally extending cutting edge 12 which can be a stationary one or can be constituted by moveable cutting elements which are oscillatingly driven by a drive 13. The free edge parts of side walls 14 of the upper part O in the vicinity of the cutting edge are formed as cutting edges 15 as well or are provided with cutting elements. The separation plane 11 has an arcuate curvature with a curvature centre situated at least substantially at the pivot axis G. Also there moveable cutting elements could be provided. Frame R2 is connected to the pivot axis G by prolongations 16 extending downwardly beyond the side walls 14. The prolongations 10, 16 could be positioned outwardly of the respective side walls 9, 14 such that two separate pivoting regions are formed (without a continuous pivot axle but with short axle sections), the lateral distance between which even can be larger than the lateral distance between the side walls.

Stiffening parts 18, 20 are provided in the angled sections 8, 8' which stiffening parts 18, 20 also connect the frame structure R1 or the frame R2 to the loading plane 5 or to the separating plane 11, respectively, and which form pocket-shaped sockets for linkage points 17, 19 of two hydraulic cylinders Z. The hydraulic cylinders Z are placed outside of side walls 14, 9.

Each hydraulic cylinder Z consists of a cylinder tube 21, a not shown piston and an extendible and retractable piston rod 22. The vertical distance between the linkage points 17, 19 is as large as possible in order to allow the use of hydraulic cylinders Z of large longitudinal extension even when retracted. In pivoting direction about the pivot axis G the angled sections 8, 8' define the biggest interior width L of the closed silage cutting implement H (FIG. 2). In the closed implement a geometrical figure resembling an isosceles triangle is formed by the hydraulic cylinders, the frame R2 and the frame structure R1, the basis length defined by the cylinders Z being longer than the two other triangle sides. The hydraulic cylinders Z are situated between the pivot axis G and the cutting edge such that they can fulfill an extension stroke of the piston rod 12 essentially corresponding to the largest interior width L. This extension stroke is magnified for the cutting edge 12, because the distance between the pivot axis G and the linkage point 17 is smaller than the distance between the pivot axis G and linkage point 19, and because the distance between the pivot axis G and the cutting edge 12 is larger than the distance between the pivot axis G and the linkage point 17. By fully extending the hydraulic cylinders the maximum silage taking range h as shown in FIG. 1 can be obtained with a height h above the ground which at least should amount to 2.2 m, preferably to 3.0 m, or even more preferably up to more than 4.0 m, corresponding with the usual heights of silage blocks in the farming industry.

Starting in the cut preparation position as shown in FIG. 1 a slice S is cut out from a silage block in one stroke and is transferred by the separation plane 11 into the interior space of the cutting implement H. Cutting edges 15 form the side surfaces of the slice S'. The cutting edges 23 co-operate with cutting edges 15 close to the end of the cutting operation to properly form the slice. Furthermore, the cutting edges 23 cut through a plastic cover of the silage block S, if provided.

First the opened cutting implement H is pushed with its tines 7 along the ground below the silage block S. The penetration depth of the tines 7 depends from the moving resistance and the desired thickness or cutting depth of the slice S' which is to be separated. The upper cutting edge 12 grips over the upper side of silage block S. Then both hydraulic cylinders S synchronously are retracted such that cutting edge 12 in co-action with cutting edges 15 separate a slice S' indicated in dotted lines. The cutting operation ends as soon as cutting edge 12 contacts the cutting edge counterstay area 6. Then side walls 14, 9 have approached each other such that no silage can fall out sidewardly. The working vehicle F moves rearwardly and lifts the filled cutting implement H. Cheeks 3 expediently are more spaced apart than the width of the vehicle, e.g. at its cabin region, such that the cutting implement H can be brought over the front axis of the working vehicle. Then the working vehicle F rolls to a mixer and fills the mixer e.g. from above, or the fodder is thrown to the ground and is mixed manually.

Figure 3:
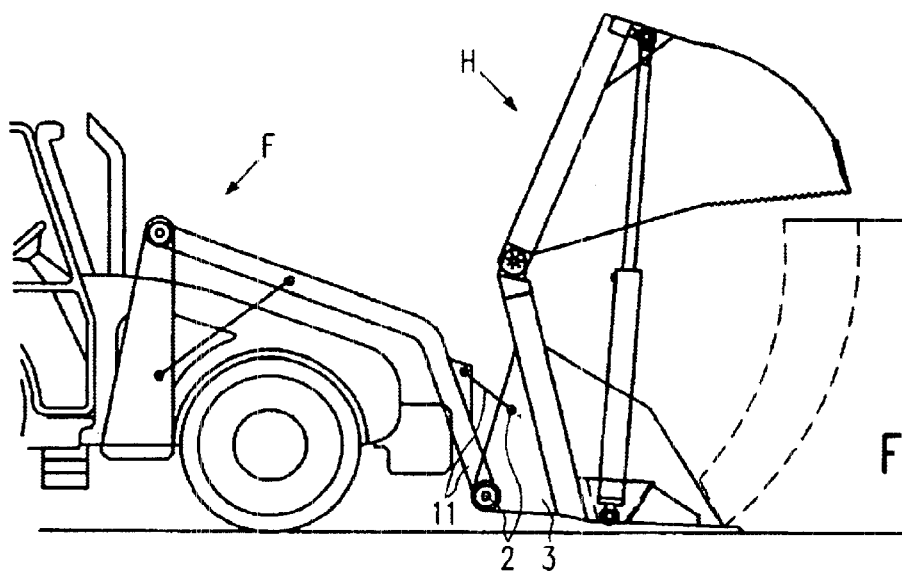
Figure 4:
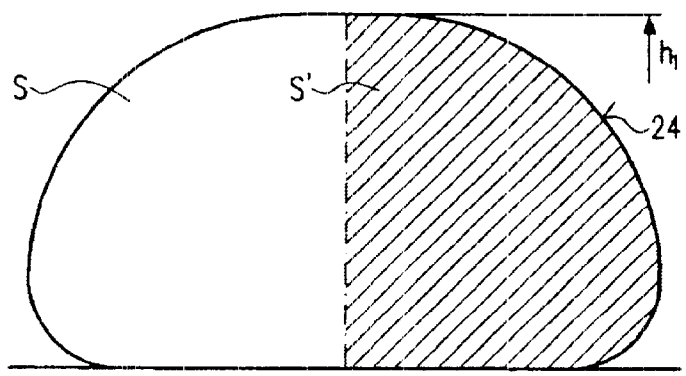

In FIG. 3 the working vehicle F is a tractor to which the silage cutting device H is mounted. Due to the large distance between the cheeks 3 the cutting implement H can be brought close to the cabin.

Figure 5:
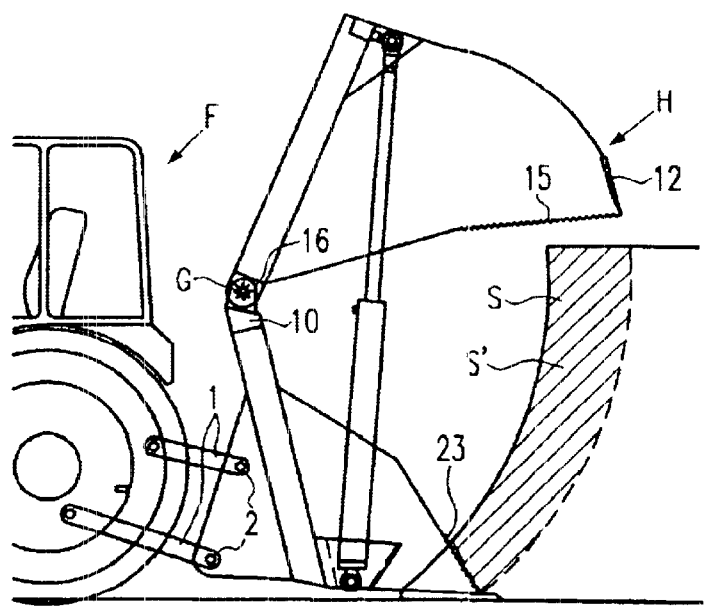

In FIG. 5 the silage cutting implement H is mounted to the rear end of a tractor. For example when using the three point hitching structure it may be expedient to position both pivoting regions (pivot axis G at the prolongations 10, 16) with a distance such that the pivot axis G can be brought close to the rear wheels of the tractor, or until the cabin partly is situated between the pivot regions when the filled cutting implement H is transported.

In FIGS. 3 and 5 the silage is taken from a silage block S having the shape of a loaf protected by a plastic cover 24. The slice S' shown in dotted lines is formed by a single cutting operation. The height h of such silage blocks S in practice amounts to about 2.2 m, while the width can amount to about 3.6 m. By cutting edges 12, 15, 23 the plastic cover 24 is properly cut.

Figure 7:
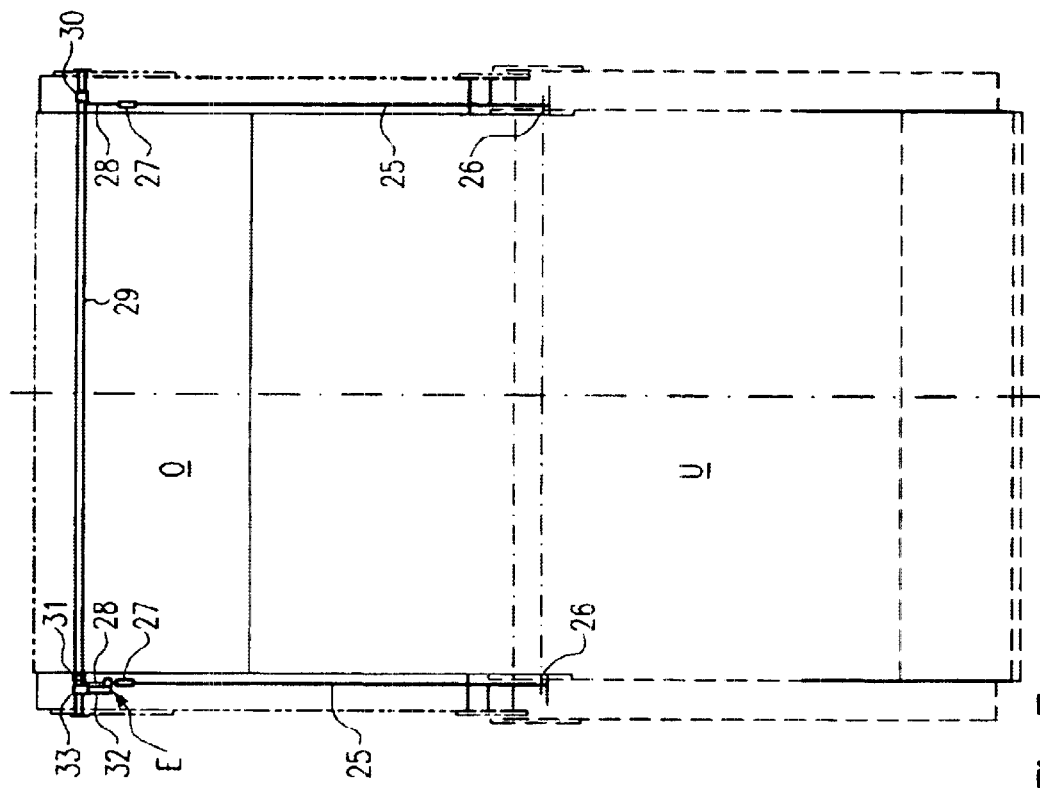
Figure 6:
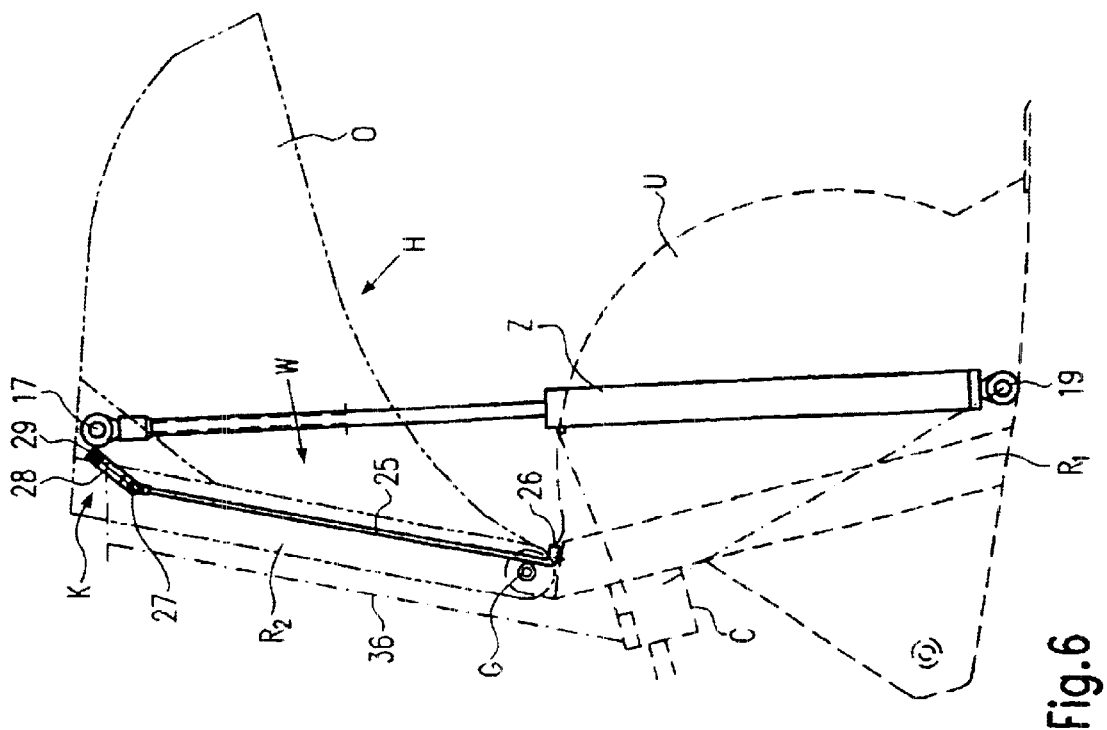

In FIGS. 6 and 7 the silage cutting implement H is equipped by an, e.g. electromechanical, sensing device W for distortions, e.g. of the upper part of the cutting implement, i.e. to detect and correct distortions during the cutting operation. Both hydraulic cylinders Z are connected to a synchronisation control C, expediently a hydraulic synchronisation control, tending to avoid a distortion of the upper part O of the cutting implement by actuating both hydraulic cylinders Z with identical active lengths or synchronously. As in practice such synchronisation controls operate with tolerances which cannot reliably exclude distortions, the above-mentioned sensing device W is provided to more reliably avoid out-of-tolerance distortions. Upon occurrence of an out-of-tolerance distortion the sensing device W either may interrupt the actuation of the hydraulic cylinders, or at least may generate an alarm signal, or may interfere directly in a correcting sense, or even actuates a correction device of the synchronisation control.

The sensing device W has linkage mechanisms at both sides of the cutting implement H which linkage mechanisms are mechanically coupled by a coupling shaft 29. A respective first link 25 bridges the pivot axis G and extends at the outer side or inside frame R2 to a linkage axis 26 provided at the frame structure R1 or at the lower part U of the cutting implement, respectively. The free end of first link 25 is pivotably coupled at 27 to a sensing link 28. In the shown, fully opened position of the cutting implement link 25 and sensing line 28 expediently form an obtuse angle. In the fully closed position of the cutting implement, however, link 25 and sensing link 28 preferably form an angle of about 90°. The free end of the sensing link 28 (one at each side of the cutting implement H) is supported at the freely rotatably supported coupling shaft 29 extending laterally through the upper part O of the cutting implement. In FIG. 7 the sensing link 28 situated at the right side is fixedly connected at 30 to the coupling shaft 29. The sensing link 28 situated in FIG. 7 at the left side is rotatably supported at 31 on the coupling shaft 29. Adjacent to the rotatable sensing link 28 a reference lever 32 is connected non-rotatably in a fixation 33 to coupling shaft 29. Between the reference lever 32 and the sensing link 28 a switching device E is provided which is actuated upon occurrence of an out-of-tolerance angular displacement between both sensing links 28. The switching device E generates the mentioned alarm signal, the switch off signal or the correction signal, respectively, which is e.g. transmitted via cables 36 to the synchronisation control C. In the sensing device W the coupling shaft 29 mechanically locks both linkage mechanisms at both sides of the cutting implement H.

Alternatively, the sensing device W instead could be mounted into the lower part U of the cutting implement, or it could extend between linkage points 17, 19. As distortions of the upper part O, or misalignments of the upper part O of the cutting implement relative to the lower part U are more critical, it is expedient to have the arrangement as shown in FIGS. 6 and 7 such that due to a magnifying effect between the long links 25 and the short sensing links 28 already small angular displacements between both sensing links 28 are picked up precisely. In case that the sensing device D is generating correction signals for the synchronisation control C, then those correction signals could be evaluated and used or could be directly used upon response of the switching device E, e.g. to delay the respective leading hydraulic cylinder Z and to let the other hydraulic cylinder follow, or the like, depending on the direction of the occurrence of the angular displacement between the sensing links 28, and until the angular displacement is eliminated.

Figure 8:
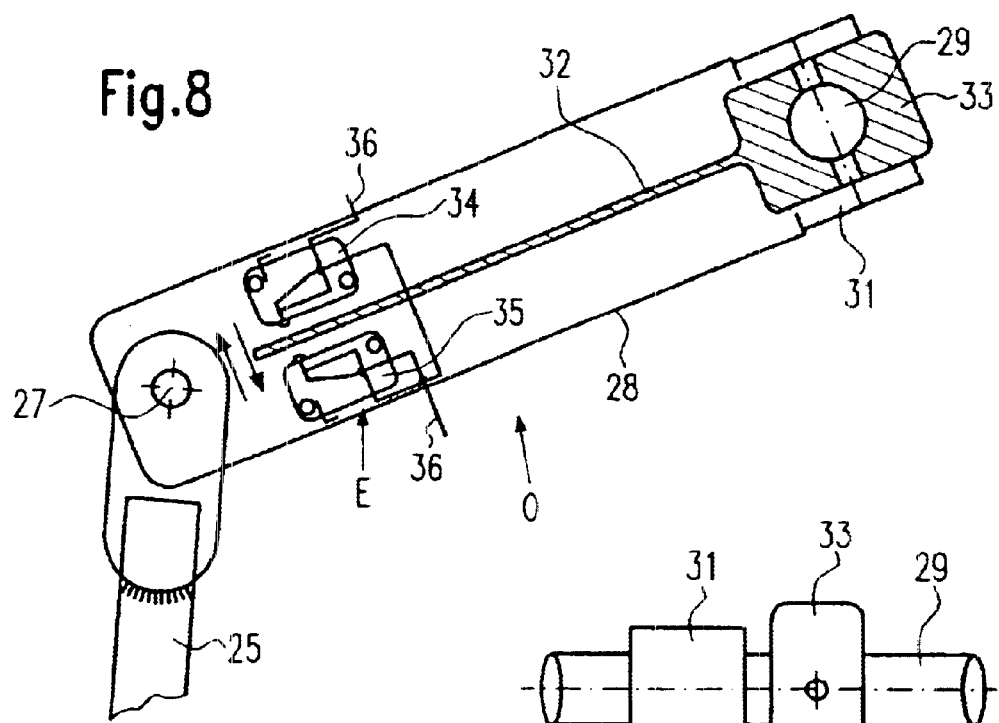
Figure 9:
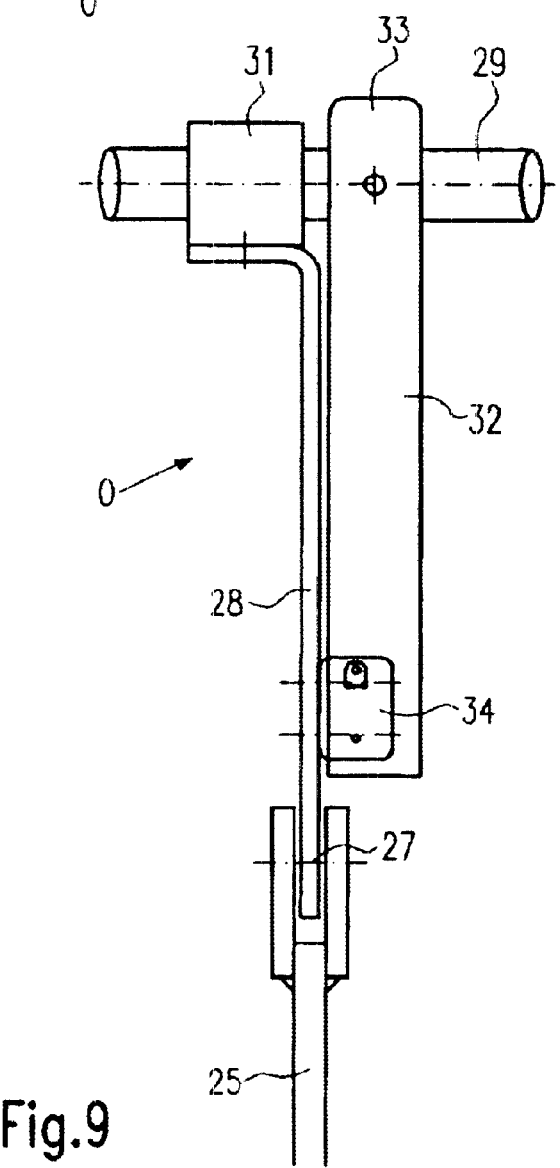

This is explained in detail with reference to FIGS. 8 and 9. As soon as the upper part O of the cutting implement starts to get distorted, because the active length of one retracted hydraulic cylinder deviates from the active length of the other retracted hydraulic cylinder, the reference lever 32 shown in FIG. 7, on the left side, (expediently formed as a flexible switch actuating tongue) being mechanically coupled to the sensing link 28 is displaced in relation to the other sensing link 28 shown on the left side in FIG. 8, which other sensing link 28 is free to rotate on coupling shaft 29, until one of the electric switches 34 or 35 of switching device E is actuated. For correction of the distortion this signal is considered by the synchronisation control C such that the respective trailing hydralic cylinder Z is advanced (and/or the leading hydralic cylinder is delayed), until the reference lever 32 again releases the actuated switch 34 or 35, respectively. Both hydralic cylinders then again will work in synchronisation.

As distortions of the upper part O of the cutting implement basically only are to be sensed during a cutting operation and should be corrected only then, instead of the described link mechanism flexible ropes could be used which can be mounted more easily. Another possibility is to fixedly connect both sensing links 28 to the coupling shaft 28 and to equip one sensing link by strain gauge elements generating analogous signals for the synchronisation control C or a switch or an alarm member in case of an angular displacement between them and in response to the occurring bending load. The sensing device W can be provided in the interior of frame R2. In case that the synchronisation control contains a flow divider the correction signal can be used to actuate a switching magnet or proportional magnet which in turn varies the flow dividing ratio respectively. Similarly, in case of a hydraulic control circuit containing pressure limiting valves and/or differential pressure control valves the settings of those valves could be temporarily varied by magnets. It is even possible to directly and mechanically transmit the sensed angular displacement to the respective components of the hydraulic control for correcting adjustments. The entire system operates fully automatically such that the operator does not have to care for occurring distortions.

What is claimed is:

1. Silage cutting implement for mounting to a mobile working vehicle, comprising:

a lower part having a rear side frame structure and a loading plane connected to said frame structure by a first angled section;

an upper part having a rear side frame and a separation plane equipped with cutting edges and connected to said frame by a second angled section, said upper part being pivotably connected at a substantially horizontal pivot axis to said lower part, wherein said first and second angled sections define a largest interior width of the cutting implement in a pivoting direction about said pivot axis in a closed condition of said cutting implement;

at least one vehicle connection assembly provided at the side of said frame structure of said lower part opposite to said loading plane, said frame structure having at least one prolongation extending upwardly beyond side walls of said lower part with said pivot axis being situated in said at least one prolongation;

hydraulic cylinders connected to said upper and lower parts between said pivot axis and said loading plane and said separation plane at the outer sides of said upper and lower parts and having linkage points in said angled sections, said hydraulic cylinders in their fully retracted condition having a length corresponding substantially to said largest interior width;

a hydraulic synchronization control associated to said hydraulic cylinders to operate said cylinders to have substantially equal active lengths under different cutting conditions;

a sensing device for sensing distortions of at least one cutting implement part provided at at least one of said cutting implement parts for overruling said synchronization control, said sensing device comprising:

two linkage mechanisms situated at both sides of said cutting implement parts, said linkage mechanisms being interconnected by a mechanical coupling, each of said linkage mechanisms for sensing the actual relative pivoting angle of a said cutting implement part at one side thereof, and a signal member associated with said mechanical coupling which is actuable when an out-of-tolerance deviation between the pivoting angles at both sides of a cutting implement part is exceeded, and for generating an alarm signal and/or a switch off signal and/or a correction signal for said synchronization control.

2. Silage cutting implement as in claim 1 wherein the distance between said pivot axis and said linkage point of said hydraulic cylinder at said lower part of said cutting implement is larger than distance between said pivot axis and said linkage point of a said hydraulic cylinder at said upper part of said cutting implement.

3. Silage cutting implement as in claim 1 wherein in a closed condition of said cutting implement the stroke of said hydraulic cylinder substantially corresponds to the distance between said linkage points, the distance between the cutting edge of said upper part and said pivot axis, and the respective distances between said upper and lower linkage point and said pivot axis being matched to each other such that in a fully opened condition of said silage cutting implement the silage intake opening in a vertical direction is in a range of from at least about 2.2 m to about 4.5 m.

4. Silage cutting implement as in claim 1 wherein said linkage points are located in stiffening parts which stiffening parts form sockets for said linkage points.

5. Silage cutting implement as in claim 1 wherein said frame structure of said lower part of said cutting implement is formed as a closed rear wall.

6. Silage cutting implement as in claim 1 wherein each said linkage mechanism comprises:

a first link linked to said lower part of said cutting implement and extending from said upper part across said pivot axis, said first link being pivotably connected with a respective one of said linkage mechanisms of said sensing device being connected to a coupling shaft extending parallel to said pivot axis and being rotatably supported at said upper part of said cutting implement, one of said linking mechanisms being fixed in non-rotatable fashion to said coupling shaft and the other of said linking mechanisms being seated in rotatable fashion on said coupling shaft, a reference lever fixed in non-rotatable fashion to said coupling shaft adjacent to said one linkage mechanism;

a signal generating switching device responsive to a relative angular displacement between said reference lever and said one linkage mechanism, and wherein said signal member is provided at one of said one linkage mechanism or said reference lever, respectively.

7. Silage cutting implement as in claim 6, wherein said reference lever is a bendable or flexible switch actuating tongue.

8. Silage cutting implement as in claim 6, wherein said switching device comprises two alternatingly actuable limit switches connected to said hydraulic synchronization control of said hydraulic cylinders.

9. Silage cutting implement as in claim 1 wherein said separation plane of said upper part of said cutting implement adjacent to said cutting edges has an arcuate curvature with the center of the curvature being situated substantially at said pivot axis.

10. Silage cutting implement as in claim 1 further comprising movable and driven cutting elements provided at free edge regions of said side walls of said upper and lower parts of said cutting implement.

11. Silage cutting implement as in claim 1 wherein said vehicle connection assemblies for mounting the silage cutting implement to the vehicle are provided at rear cheeks of said frame structure, the horizontal distance between said cheeks being larger than the width of said working vehicle and/or larger than the width of a cabin of the working vehicle.

* * * * *